SECRECY COMMUNICATION SYSTEM

Filed March 1, 1954

5 Sheets-Sheet 1

WALTER S. DRUZ
ERWIN M. ROSCHKE
INVENTORS.
BY Francis W. Crotty
THEIR ATTORNEY

SECRECY COMMUNICATION SYSTEM

Filed March 1, 1954 5 Sheets-Sheet 2

WALTER S. DRUZ
ERWIN M. ROSCHKE
*INVENTORS.*

BY Francis W. Crotty

THEIR ATTORNEY.

July 21, 1959 W. S. DRUZ ET AL 2,896,071

SECRECY COMMUNICATION SYSTEM

Filed March 1, 1954 5 Sheets-Sheet 3

INVENTORS:
WALTER S. DRUZ
ERWIN M. ROSCHKE
BY Francis W. Crotty
THEIR ATTORNEY.

July 21, 1959 W. S. DRUZ ET AL 2,896,071

SECRECY COMMUNICATION SYSTEM

Filed March 1, 1954 5 Sheets-Sheet 4

(Reduced Scale compared to Fig. 3)

INVENTORS:
WALTER S. DRUZ
ERWIN M. ROSCHKE

BY Francis W. Crotty

THEIR ATTORNEY.

SECRECY COMMUNICATION SYSTEM

Filed March 1, 1954

WALTER S. DRUZ
ERWIN M. ROSCHKE
*INVENTORS.*

BY Francis W. Crotty

THEIR ATTORNEY.

United States Patent Office 2,896,071

Patented July 21, 1959

2,896,071

SECRECY COMMUNICATION SYSTEM

Walter S. Druz, Bensenville, and Erwin M. Roschke, Des Plaines, Ill., assignors to Zenith Radio Corporation, a corporation of Delaware Application March 1, 1954, Serial No. 413,272

9 Claims. (Cl. 250—6)

This invention pertains to secrecy communication systems in which an intelligence signal is transmitted in coded form to be utilized only in a receiver equipped with a decoding device controlled in accordance with the coding schedule employed at the transmitter.

Numerous secrecy systems have been proposed in which an intelligence signal, for example an audio signal, is coded by altering some characteristic of that signal, such as phase, usually at randomly spaced time intervals determined by a prescribed code schedule which is made known only to authorized receivers. Compensating alterations are effected at each receiver in accordance with the prescribed code schedule effectively to decode the coded intelligence signal. In order to maintain precise synchronization between the coding and decoding equipment as to the exact occurrences of the mode changes, that is, the alterations or variations of the intelligence signal, it is usually necessary to provide some additional apparatus. This may be accomplished, for example, by employing at the transmitter and various receivers code-storage devices such as rotating discs or tapes upon which the code schedule is recorded; the rotation of these discs or tapes may then be conveniently synchronized from the existing 60-cycle power supply.

However, to enhance the secrecy aspects of the system it may be desirable to employ a flexible or varying code schedule which changes from moment to moment rather than a fixed, repetitive schedule as is the case with the code-storage devices. One method of obtaining such flexible operation is to transmit precisely timed pulses each having at least one relatively steep-shaped edge. The decoding appartaus may then utilize the pulses to execute mode changes in exact time coincidence with the mode changes at the transmitter since the sharp edge of the pulses may effect instantaneous operation. Of course, sharp or steep-sided pulses or "spikes" are required in order to insure simultaneous actuation of the transmitter and receiver encoding equipment.

The transmission of sharply defined pulses along with the coded intelligence signal does effect very adequate coding or scrambling of the signal and it is rather difficult for an unauthorized person to decode or decipher the coded signal in view of the complex and non-repetitive nature of the code schedule. The difficulty, however, presented by this type of transmission resides in the relatively wide band width required to transmit the sharply defined pulses. For example, a commercial frequency modulated (hereinafter referred to as FM) radio station is only permitted to deviate from the assigned main carrier frequency plus or minus 75 kilocycles under present United States standards, a band width which is completely inadequate for sharp-pulse transmission.

In accordance with the present invention, this problem has been overcome in order to permit synchronous operation in accordance with a flexible coding schedule in a system wherein the frenquency components of the intelligence signal lie entirely within a relatively narrow frequency band, as is the case with a conventional FM system. This is achieved by initially developing a signal having a sinusoidal wave shape and having a frequency also falling within the narrow frequency band. The sinusoidal signal is converted into a pulse signal at the transmitter and the coding apparatus is actuated in response to, and in time coincidence with, selected ones of the pulses to effect coding. The selection may be made in accordance with a predetermined code pattern which is known only by authorized receivers. Meanwhile, the sinusoidal signal is also transmitted to the authorized receivers along with the coded intelligence signal and is converted into similar pulse signals at such receivers. The decoding apparatus is subsequently actuated in response to the same selected pulses as at the transmitter in order to realize precise synchronization.

It is, accordingly, an object of the present invention to provide a new and improved secrecy communication system wherein the intelligence signal is coded with a high degree of complexity.

It is another object of the invention to provide a secrecy communication system in which mode changes of the intelligence signal are achieved at the transmitter and various receivers in exact time coincidence, without imposing any increase in the frequency bandwidth required for faithful signal transmission and reproduction.

It is a further object of the present invention to provide a secrecy communication system wherein precise registration is maintained between the encoding apparatus at the transmitter and at the authorized receivers even though such coding may proceed in accordance with a random schedule.

It is still another object of the invention to provide an FM radio system wherein a sine wave coding signal having a frequency falling within the frequency band allotted to the FM transmitter is employed to code the FM signal at the transmitter and is transmitted along with the FM signal to authorized receivers to control appropriate decoding equipment.

A secrecy communication system, constructed in accordance with the present invention, comprises means for developing an intelligence signal consisting of frequency components falling within a relatively narrow frequency band. An encoding device is coupled to the intelligence signal developing means and operates in response to an applied control signal for varying the operating mode of the communication system effectively to encode the intelligence signal. A signal source is provided for developing a signal having a sinusoidal wave shape and having a predetermined frequency also falling within the narrow frequency band. Pulse forming means is coupled to the signal source for developing a series of signal pulses periodically recurring at a frequency related to the predetermined frequency and individually exhibiting a relatively high order of precision timing. Gating means is coupled to the pulse forming means for selecting only certain ones of the signal pulses, and a control mechanism is coupled to this gating means for developing a control signal having characteristic variations occurring in time intervals determined by at least some of the pulses selected by the gating means. Finally, the secrecy communication system includes means coupling the control mechanism to the encoding device to effect actuation of the device for varying the operating mode of the system in response to, and in time coincidence with, each of the characteristic variations of the control signal.

The features of this invention which are believed to be new are set forth with particularity in the appended claims. The invention, together with further objects and advantages thereof, may best be understood, however, by reference to the following description in conjunction with the accompanying drawings, in which:

While the present invention is applicable to any type of narrow-band secrecy communication and, moreover, to any type of coding, it is illustrated in connection with a subscription FM radio system for convenience. The invention is particularly useful in permitting convenient conversion of existing commercial FM stations to subscription service. There are existing closed line circuit arrangements wherein FM signals, particularly music, are "piped" or channeled to eating establishments, stores, etc. on a subscription basis; the present invention may be employed to achieve the same results but without requiring a closed line circuit between transmitter and receiver.

Figure 1:
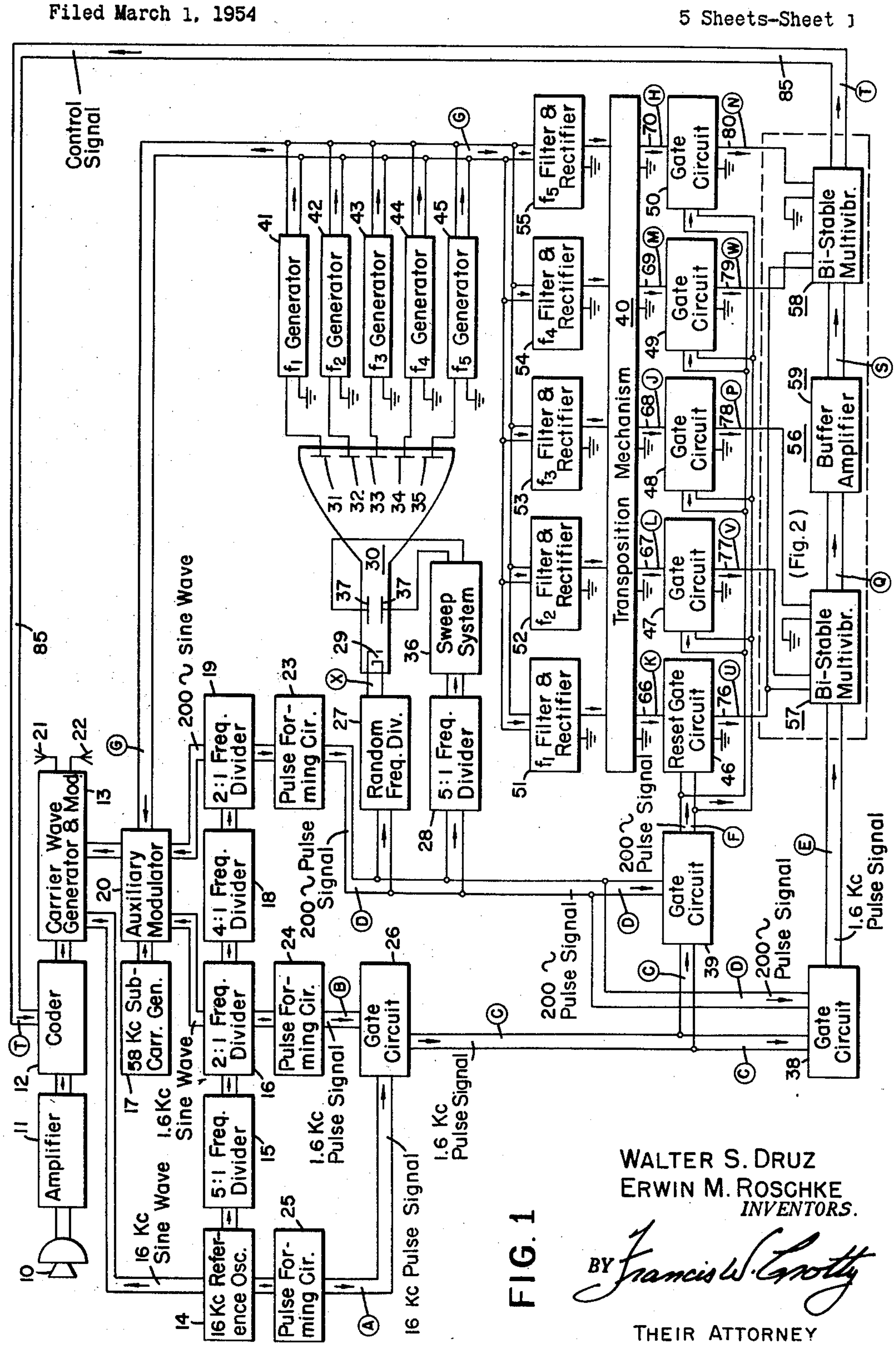
Figure 1 is a schematic representation of a secrecy communication system, specifically an FM radio transmitter, constructed in accordance with the invention.

The transmitter of Figure 1 includes a conventional microphone 10 coupled through an amplifier 11 to one pair of input terminals of an encoding device or coder 12. This coder may be of any suitable type which responds to characteristic variations of an applied control signal to vary the operating mode of the transmitter. For example, coder 12 may taken the form of a phase inverter which inverts the phase of the applied intelligence signal in response to amplitude changes of an applied coding signal. The output circuit of coder 12 is connected to a carrier-wave generator and modulator 13, having output terminals connected to an antenna 21, 22.

An appropriate coder of the phase-inverting type is disclosed in detail in copending application Serial No. 366,727, filed July 8, 1953, and issued September 16, 1958, as Patent 2,852,598, in the name of Erwin M. Roschke, and assigned to the present assignee. In that application, a beam-deflection device is provided having a control grid modulated in accordance with the audio intelligence and a pair of collector anodes connected to opposite terminals of the primary winding of an output transformer. A control signal is applied to the deflection electrodes of the beam tube so that the phase of the audio signal is effectively inverted at the secondary winding of the transformer each time the beam switches from one anode to the other, and this occurs each time there is a transition of the control signal between two predetermined adjacent amplitude ranges.

A reference oscillator 14, which produces a sinusoidal signal having a frequency of 16 kilocycles per second, has one pair of output terminals connected to modulator 13, another pair of output terminals connected to a 5:1 frequency divider 15, and still another pair of output terminals connected to a pulse forming circuit 25. The output circuit of frequency divider 15 is connected to a 2:1 frequency divider 16 to produce a 1.6-kilocycle sine wave signal which is supplied to an auxiliary modulator 20, a 4:1 frequency divider 18 and a pulse forming circuit 24. A sub-carrier generator 17 supplies a 58-kilocycle subcarrier wave to auxiliary modulator 20. Frequency divider 18 is connected to a 2:1 frequency divider 19 in order to produce a 200-cycle sine wave which is supplied to modulator 20 and also to a pulse forming circuit 23.

Pulse forming circuit 25 is connected to one pair of input terminals of a normally-closed gate circuit 26 in order to supply a 16-kilocycle pulse signal thereto. Gate circuit 26 is also connected to pulse forming circuit 24 in order to derive a 1.6-kilocycle pulse signal therefrom which serves as a gating signal. The output terminals of gate 26 are connected to a normally-closed gate circuit 39 and also to a normally-open gate circuit 38, both of these gate circuits having additional input circuits connected to pulse forming circuit 23 in order to derive a 200-cycle pulse signal for gating purposes.

The output terminals of normally-open gate circuit 38 are connected to the input terminals of a conventional bi-stable multivibrator 57, which constitutes one portion of a control mechanism 56, such that the multivibrator is triggered from one to the other of its two stable operating conditions in response to successive applied pulses. Multivibrator 57 is coupled through a buffer amplifier 59 to the input terminals of another bi-stable multivibrator 58, units 59 and 58 constituting the remaining portion of control mechanism 56. Multivibrator 58 has its output terminals connected to coder 12 over conductors 85 and, as explained in detail hereinafter in connection with Figure 2, control mechanism 56 operates in response to an applied pulse signal from gate circuit 38 to effect actuation of the encoding device between its operating conditions to encode the audio signal in accordance with a predetermined code schedule.

Pulse forming circuit 23 additionally supplies pulses periodically recurring at a 200-cycle rate to a random frequency divider 27, which may be constructed in the manner described and claimed in Patent 2,588,413, issued March 11, 1952, in the name of Erwin M. Roschke, and assigned to the present assignee. The output terminals of the divider are connected to input electrodes 29 of a cathode-ray commutator tube 30. Pulse forming circuit 23 also supplies pulses through a 5:1 frequency divider 28 to a sweep system 36, having output terminals connected to the deflection elements 37 of commutator device 30. The commutator has a series of segmental anode electrodes 31–35 which are individually connected to an assigned one of a corresponding series of signal generators 41–45, individually constructed to generate a signal of a distinctive frequency when actuated by a pulse from commutator 30. Specifically, each generator is "turned on" or energized by a current pulse resulting from the impingement of the electron beam in device 30 upon the associated anode segment. Each of the generators 41–45 includes a cycling or timing feature in the manner of a blocking oscillator or other mono-stable generator to determine the duration of the interval during which the generator is energized in order that the output signal obtained therefrom may have a selected duration greater than the duration of the current pulse delivered by its associated anode segment but less than the time separation of successive 200-cycle pulses. Each of the generators 41–45 has a distinct, assigned operating frequency as indicated by the indicia $f_1$–$f_5$ in order to facilitate frequency selection of the outputs from such generators. The output terminals of the generators are connected together and to auxiliary modulator 20.

The signal components having various frequencies $f_1$–$f_5$ are also applied to the input circuits of a series of parallel-connected filter and rectifier units 51–55, each of which is selective to one of the different signal burst frequencies, to facilitate their separation from one another for selective application to a series of input circuits of a transposition mechanism 40. This mechanism, which is adjusted in accordance with a predetermined switch setting pattern, is provided merely for the purpose of selectively connecting any one of the five filter and rectifier units 51–55 to any one of five output circuits or conductors 66–70 and may comprise a family of toggle switches as shown in copending application Serial No. 326,107, filed December 15, 1952, and issued February 11, 1958, as Patent 2,823,252, in the name of Jack E. Bridges, or a wafer switch arrangement as disclosed in copending application Serial No. 338,033, filed February 20, 1953, in the name of George V. Morris, now abandoned in favor of continuation-in-part application Serial No. 407,192, filed February 1, 1954, and issued December 30, 1958, as Patent 2,866,961, both of which are assigned to the present assignee.

Conductors 66–70 are connected respectively to a series of normally-closed gate circuits 46–50, these gate circuits individually having another pair of input terminals connected to gate circuit 39 to derive a 200-cycle pulse signal therefrom. It will be noted that circuit 46 has been designated a reset gate circuit; as explained hereinafter, this gate functions to occasionally reset control mechanism 56 to a predetermined operating condition in order to insure that the coding and decoding apparatus remain in step. A similar reset gate is provided at each receiver to effect a similar resetting operation. The output circuit of reset gate 46 is connected over conductor 76 to one input circuit of bi-stable multi-vibrator 57 and also to one input circuit of bi-stable multivibrator 58. The output circuits of gates 47 and 48 are connected over conductors 77 and 78 respectively to bi-stable multivibrator 57, and the output circuits of gates 49 and 50 are connected over conductors 79 and 80 respectively to bi-stable multivibrator 58.

Figure 2:
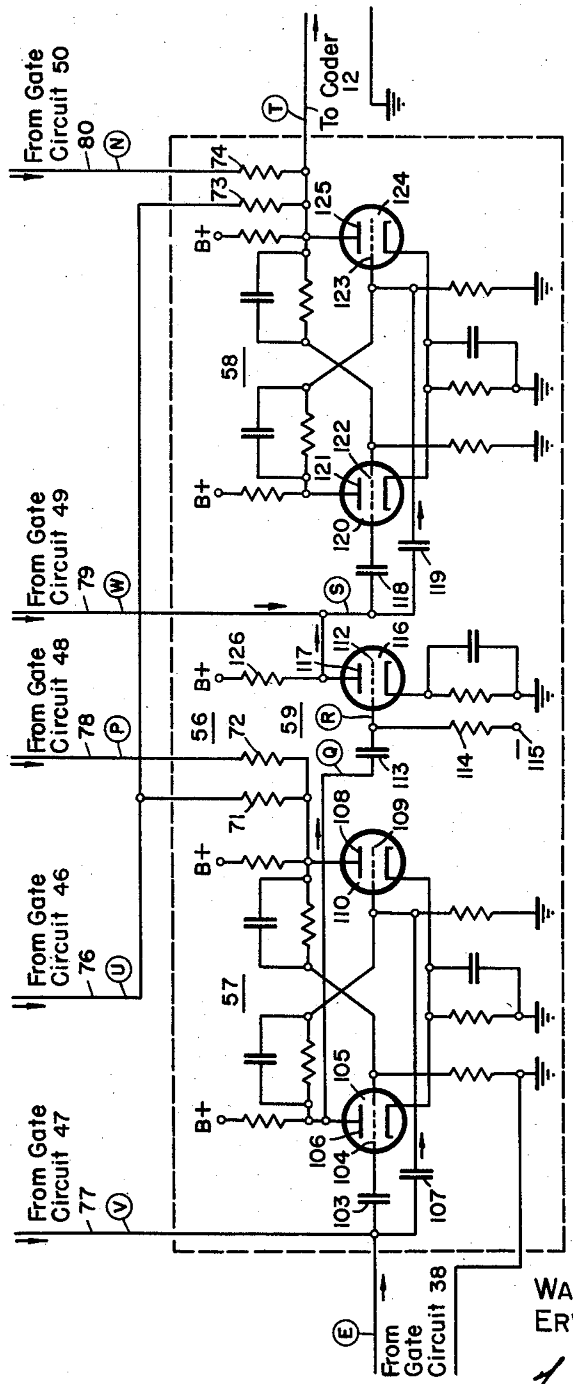
Figure 2 is a detailed schematic representation of a portion of the transmitter illustrated in Figure 1.

Reference is now made to the construction of control mechanism 56 and particularly to Figure 2 wherein this mechanism is shown in detail. Control mechanism 56 has a sequence of operating steps and is actuated through this sequence by means of the periodically recurring pulses which are derived from gate circuit 38 and applied through a condenser 103 to the control electrode 104 of an electron-discharge device 105 and through a condenser 107 to the control electrode 109 of an electron-discharge device 110, devices 105 and 110 being connected in a conventional bi-stable multivibrator circuit 57. The control electrode 112 of buffer amplifier tube 116 is connected to anode 106 of device 105 through a condenser 113, control electrode 112 also being connected to a source of negative bias potential 115 through a resistor 114 which in combination with condenser 113 forms a differentiating circuit. The anode 117 of discharge device 116 is connected to B+ through a load resistor 126 and through condensers 118 and 119 to the control electrodes 122 and 123 of a pair of electron-discharge devices 120 and 124 respectively, these devices and their associated circuit elements constituting a conventional bi-stable multivibrator 58. Output conductor 77 from gate circuit 47 is connected to control electrodes 104 and 109 through condensers 103 and 107 respectively, output conductor 78 from gate circuit 48 is connected through a resistor 72 to anode 108 of device 110, output conductor 79 from gate circuit 49 is connected to control electrodes 122 and 123 through condensers 118 and 119 respectively, output conductor 80 from gate circuit 50 is connected through a resistor 74 to anode 125 of device 124, and output conductor 76 from reset gate circuit 46 is connected through a resistor 71 to anode 108 and through a resistor 73 to anode 125.

By way of summary, the disclosed secrecy communication system of Figure 1 comprises a microphone 10 and amplifier 11 for developing an intelligence signal consisting of frequency components falling within a relatively narrow frequency band. In particular, the intelligence signal comprises a sound signal having frequency components within the audible range from 10 to 20,000 cycles or a portion thereof, as distinguished from video signals having significant frequency components extending over a relatively wide frequency band extending over a range of several megacycles. Encoding device 12 is coupled to microphone 10 and amplifier 11 and operates in response to a control signal applied from conductors 85 to vary the operating mode of the system effectively to encode the intelligence signal. Reference oscillator 14 develops a signal having a sinusoidal wave shape and having a predetermined frequency, specifically 16 kilocycles per second in the illustrated embodiment, also falling within the narrow frequency band. Pulse forming means 25 is coupled to reference oscillator 14 for developing a series of pulses periodically recurring at a frequency related to the predetermined frequency, and individually exhibiting a relatively high order of precision timing. As illustrated, circuit 25 converts the 16-kilocycle sine wave signal into a 16-kilocycle pulse signal, but it should be apparent that a pulse signal having a suitable frequency different from that of the sine wave, may be utilized without departing from the invention. For example, oscillator 14 may generate a frequency of 48 kilocycles per second and pulse forming circuit 25 may be constructed to convert the sinusoidal output signal directly to a 16-kilocycle pulse signal.

Gate circuits 26 and 38 constitute gating means coupled to pulse forming circuit 25 for selecting only certain ones of the signal pulses developed by circuit 25. Control mechanism 56 is coupled to the gating means for developing a control signal having characteristic variations occurring in time intervals determined by at least some of the pulses selected by the gating means. Finally, means, shown as conductors 85, are provided for coupling control mechanism 56 to encoding device 12 to effect actuation of the device for varying the operating mode of the system in response to, and in time coincidence with, each such characteristic variation.

In order to simplify the detailed explanation of the operation of the invention, the described transmitter will first be considered briefly without regard to the specific function and effect of dividers 27, 28, sweep system 36, gate circuit 39, commutator tube 30, generators 41–45, filter and rectifier units 51–55, transposition mechanism 40, and gate circuits 46–50. Audio information is picked up by microphone 10 and supplied through amplifier 11 and coder 12 to carrier-wave generator and modulator 13 wherein the audio information is frequency modulated on a suitable carrier. The modulated carrier wave is then radiated to authorized receivers from antenna 21, 22.

Reference oscillator 14 produces a 16-kilocycle sinusoidal signal which is converted into a pulse signal in pulse forming circuit 25 and applied to one input circuit of normally-closed gate circuit 26. At the same time, a 1.6-kilocycle sine wave signal is developed in divider 16 and is converted into a 1.6-kilocycle pulse signal in circuit 24 and supplied to another input circuit of gate 26 to serve as a gating signal therefor. The pulses of the 1.6-kilocycle signal gate-in the pulses of the 16-kilocycle signal occurring in time coincidence therewith so that pulses are developed in the output of gate 26 having a recurrence frequency of 1.6 kilocycles per second but individually having a relatively narrow pulse width.

The pulse signal from gate circuit 26 is applied to normally-open gate circuit 38 which is also supplied with a 200-cycle pulse signal, which serves as a gating signal, from pulse-forming circuit 23. The pulses of the 200-cycle signal effectively gate-out every eighth pulse from the 1.6-kilocycle signal for a purpose explained in detail hereinafter. A 1.6-kilocycle pulse signal, modified by the elimination of every eighth pulse, is thus supplied to bi-stable multivibrator 57. Multivibrator 57 functions in a conventional manner and is triggered between its two operating conditions in response to successive applied pulses from gate 38 to supply a generally square-wave signal (which is periodic except for the interruption caused by the gated-out pulses) to buffer amplifier 59. Amplifier 59 differentiates the square-wave signal from multivibrator 57 and supplies pulses in response to positive excursions of the signal from multivibrator 57 to the input of bi-stable multivibrator 58 which also operates in a conventional manner to produce a generally square-wave signal in which the amplitude excursions correspond to successive applied pulses.

Multivibrator 57 therefore serves as a binary counter to produce a signal having a frequency of approximately 800 cycles per second, and multivibrator 58 also functions as a binary counter operating from the 800-cycle signal to develop a signal having a frequency of approximately 400 cycles per second. The output signal from multivibrator 58 is supplied to coder 12 over conductors 85 to invert the phase of the audio signal in response to each amplitude variation. It has been found that phase inverting the audio signal at approximately 400 cycles per second results in such effective coding as to render the audio information completely unintelligible to unauthorized receivers.

Figure 3:
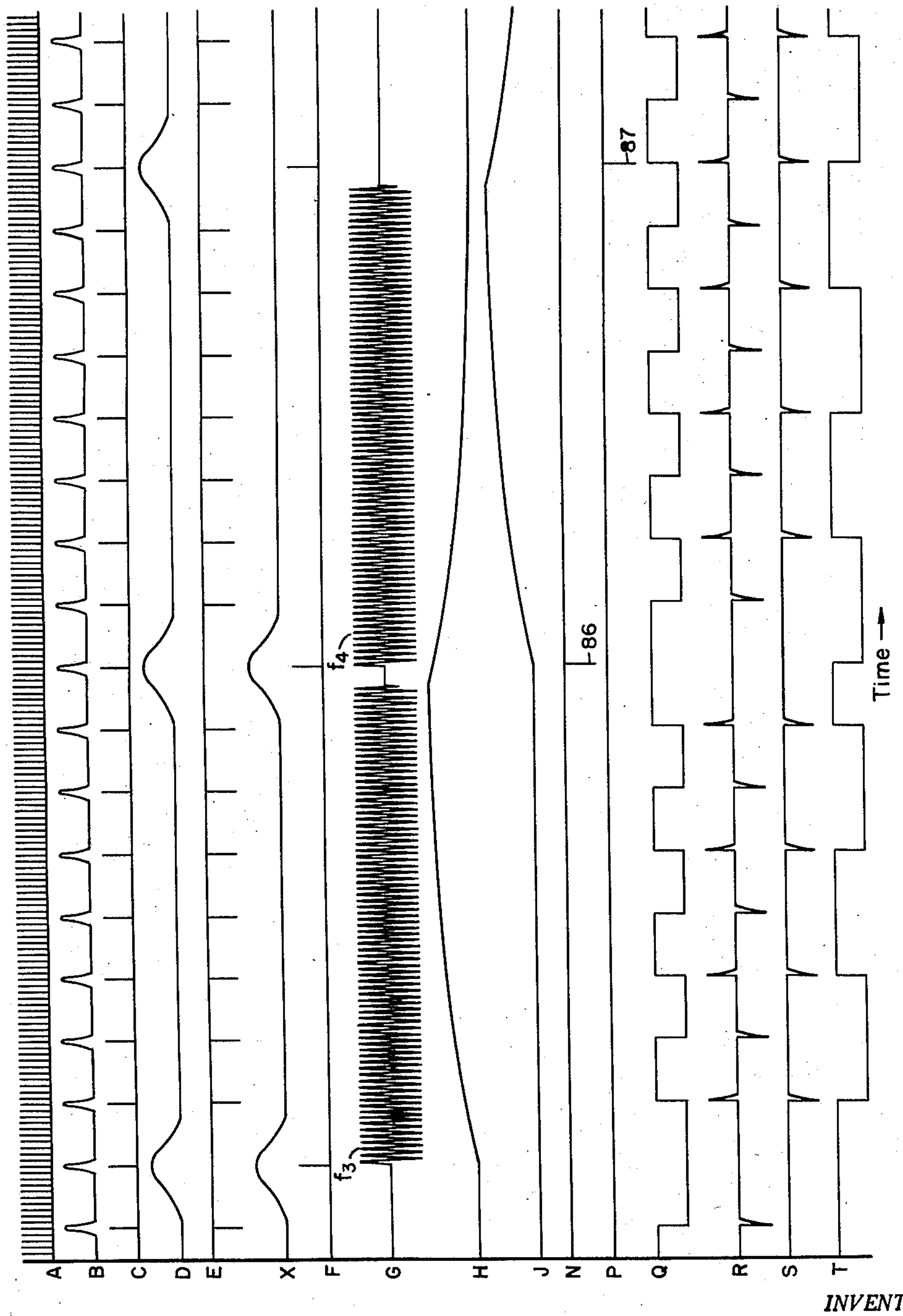
Figures 3 and 4 are graphical representations useful in explaining the operation of the secrecy system of Figures 1 and 2.
Figure 4:
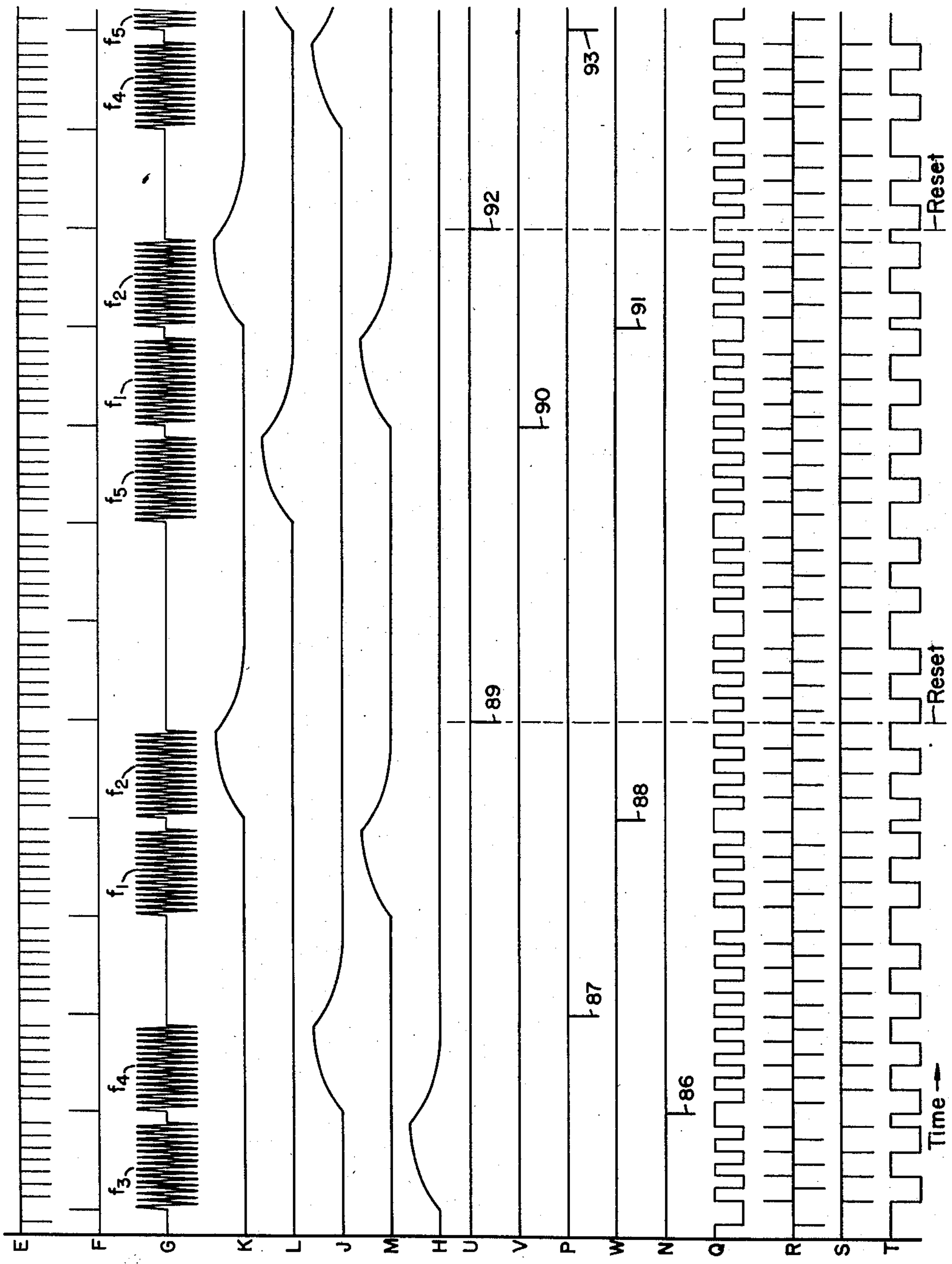

Consideration will now be given to the particular manner in which the cyclic operation of control mechanism 56 is interrupted at times to enhance the secrecy aspects of the system, with particular reference to the idealized signal wave forms of Figures 3 and 4 which appear at various points in the transmitter as indicated by the encircled reference letters. Pulses periodically recurring at a 16-kilocycle rate are developed in pulse forming circuit 25 and are applied to gate circuit 26, these pulses individually exhibiting a relatively narrow pulse width and a relatively high order of precision timing as illustrated in curve A. At the same time, pulse forming circuit 24 develops a series of pulses (curve B) periodically recurring at a rate (1.6 kilocycles per second) which is relatively low as compared to the recurrence rate of the pulses from circuit 25. It can also be seen in examining the wave form of the pulses of curve B with respect to the waveform of the pulses of curve A that the 1.6-kilocycle pulses are relatively wide and exhibit a relatively low order of precision timing as compared with the 16-kilocycle pulses.

The pulses of curve B gate-in every 10th pulse of curve A in circuit 26, which may include a simple triode amplifier to re-invert the gated pulses so that the positive-polarity output signal of curve C, which consists of a series of pulses periodically recurring at the relatively low rate of 1.6 kilocycles per second but individually having the relatively narrow pulse width and the relatively high order of precision timing of the 16-kilocycle pulse signal, is developed. The pulses of curve C are supplied to normally-open gate circuit 38 which also receives a 200-cycle pulse signal (curve D) from pulse forming circuit 23. Periodically recurring negative pulses as shown in curve E are therefore developed at the output of gate circuit 38. By comparing curves E and C it will be noted that pulses of curve C are gated-out at a 200-cycle rate to produce the signal of curve E. The pulses of curve E are supplied to multivibrator 57 to effect actuation thereof in response to each such pulse. Thus control mechanism 56 is primarily actuated at a periodic 1.6-kilocycle rate, but at the times when pulses of curve C are gated-out, control mechanism 56 is actuated by pulses supplied thereto through gate circuits 46–50.

Digressing for the moment from the operation of control mechanism 56 and considering now the specific manner in which the cyclic operation of that mechanism is interrupted, pulse forming circuit 23 supplies the pulses of curve D to random frequency divider 27 which selects individual pulses at random to supply the pulses of curve X to input electrodes 29 of commutator device 30. The commutator tube, which may be of well-known construction, includes an electron gun for projecting an electron beam which is intensity-modulated by the pulses of curve X. The intensity-modulated electron beam is scanned over anode electrodes 31–35 by the deflection signal applied to deflection elements 37 from sweep system 36. The 5:1 frequency divider 28 is also supplied with the pulses of curve D to establish the sweep frequency of the electron beam at ⅕ the frequency of the pulses of curve D, or 40 cycles per second.

Since random divider 27 and 5:1 divider 28 are driven by the same 200-cycle pulse input signal, each signal pulse of curve X occurs during an interval when the cathode-ray beam is directed to one of the anodes 31–35. For example, the first pulse of curve X may occur and energize the beam when the sweep signal directs the beam to anode 33. Consequently, a pulse of current flows through the commutator tube to $f_3$ generator 43.

This current flow triggers or shock excites generator 43 into oscillation in any well-known manner. Thus, generator 43 produces a signal burst of frequency $f_3$, shown in curve G. As mentioned hereinbefore, each of generators 41–45 includes a cycling device to restrict the individual output signal bursts to a duration slightly less than the interval between successive pulses of curve D.

The next pulse of curve X may occur when the beam of commutator device 30 is directed to anode segment 34 to cause generator 44 to produce a burst of signal of frequency $f_4$, as shown in curve G. From an examination of Figure 4, which illustrates most of the wave forms of Figure 3 on a reduced time scale, it is apparent that due to the random frequency division effected by divider 27, signal bursts are produced by generators 41–45 in accordance with a very irregular pattern. For example, upon the termination of the pulse of curve X which effects the generation of the first $f_4$ burst of curve G, the beam of commutator tube 30 may not be energized again until it is incident on anode 31. Generator 41 is thus triggered to produce a signal burst of frequency $f_1$. Similarly, the beam may be energized when it reaches the next succeeding anode 32 to produce a burst of frequency $f_2$. As the beam is swept across the anodes 31–35 in cyclic manner, the same general process takes place with the actuation of the generators 41–45 being determined by the pulse components supplied by random divider 27 during any sweep cycle.

The signal bursts of curve G are supplied to filter and rectifier units 51–55 wherein they are separated one from another and rectified for individual application to the various input circuits of transposition mechanism 40. This mechanism is set for each program interval in accordance with predetermined code information to establish prescribed circuit connections between its input circuits and output circuits 66–70 so that the rectified components are supplied to normally-closed gate circuits 46–50 in accordance with a predetermined code pattern; for optimum secrecy, the setting of transposition mechanism is varied frequently, as for example, at the end of each program interval. For purposes of illustration, it may be assumed that mechanism 40 is so adjusted that $f_2$ filter and rectifier unit 52 is connected to conductor 66 to supply the rectified $f_2$ bursts of curve K to reset gate circuit 46, that $f_5$ filter and rectifier unit 55 is connected via transposition mechanism 40 to conductor 67 to supply the rectified $f_5$ bursts as shown in curve L to gate circuit 47, that $f_4$ filter and rectifier unit 54 is connected through the transposer to conductor 68 to apply the rectified $f_4$ bursts of curve J to gate circuit 48, that $f_1$ filter and rectifier 51 is connected through mechanism 40 to conductor 69 for the application of the bursts of curve M to gate circuit 49, and finally, that $f_3$ filter and rectifier unit 53 is connected by means of transposition mechanism 40 to conductor 70 to impress the rectified $f_3$ burst of curve H on gate circuit 50.

Normally-closed gate circuit 39 receives the pulses of curve C from gate circuit 26 and the pulses of curve D from pulse forming circuit 23. The 200-cycle pulses of curve D gate-in every eighth pulse of the pulses of curve C; a simple phase inverter such as a triode amplifier may be included in gate circuit 39 to develop the positive-polarity pulses of curve F, which only occur at a 200-cycle rate but have the sharpness of the 16-kilocycle pulse signal.

Normally-closed gate circuits 46–50 receive the pulses of curve F from gate circuit 39, and the gating signals of curves K, L, J, M and H gate-in the pulses of curve F that occur in time coincidence with each individual gating pulse, so that the signal of curve U is supplied over conductor 76 to multivibrators 57 and 58, the signals of curves V and P are supplied over conductors 77 and 78 respectively, to multivibrator 57, and the signals of curves W and N are translated over conductors 79 and 80 respectively to bi-stable multivibrator 58.

Consideration will now be given to the operation of control mechanism 56 in response to the pulses of curve E and also in response to the pulses of curves U, V, P, W and N, with particular reference to the detailed schematic of Figure 2. For convenience, bi-stable multivibrator 57 is assumed to be initially in its operating condition wherein discharge device 105 is non-conductive and device 110 is conductive, as indicated by wave form Q which appears at anode 106, although the initial operating condition is immaterial since each pulse of wave form E is applied to the control electrodes of both tubes 105 and 110 and thus is effective to cut-off the conducting tube whichever one that may be. On application of the first pulse of waveform E, discharge device 105 is therefore made conductive and, by means of well-known multivibrator action, device 110 becomes non-conductive. Similarly, in response to the second pulse of curve E, multivibrator 57 is again triggered inasmuch as the negative pulse is applied to control electrode 104 to cause device 105 to become non-conductive and device 110 conductive. Thus, by virtue of the fact that the negative pulses of curve E are always applied to the control electrodes of both tubes of multivibrator 57, this circuit is triggered between its operating conditions by successive E pulses to develop the output signal of curve Q.

Multivibrator 57 operates in this manner until pulse 87 of curve P is received over conductor 78 and is impressed on control electrode 104 of device 105 over resistor 72 and the cross-coupling network from anode 108. Finding device 105 in a conductive state (as shown by curve Q), pulse 87 is effective to render the device non-conductive; multivibrator 57 therefore changes operating conditions. Pulse 86 of curve N and pulse 88 of curve W have no effect on multivibrator 57 since they are applied to multivibrator 58. Multivibrator 57 operates from one to another of its two operating conditions in response to the pulses from curve E until the arrival of reset pulse 89 of curve U which is impressed on control electrode 104 of device 105 via resistor 71 and the cross-coupling network from anode 108. Pulse 89 is also applied to control grid 122 of discharge device 120 of multivibrator 58 in order to reset both of the multivibrators to a reference operating condition. As explained, hereinafter, similar apparatus is employed at authorized receivers and a similar pulse 89 is applied to a control mechanism to reset that mechanism to the same predetermined operating condition. Such a reset operation insures that the multivibrators at the transmitter and various receivers are maintained in step in order to prevent out-of-step operation which may occur due to noise or other extraneous signals. Of course, any of the five frequencies may be used as the reset frequency; $f_5$ has been used for illustrative purposes only.

Reset or reference pulse 89 of curve U is applied to control grid 104 of device 105 at a time when that device is in its conductive condition and therefore is effective to render the device non-conductive. Of course, reset pulses arriving at times when device 105 is non-conductive and device 110 conductive, which is considered the reference operating condition, have no effect.

Multivibrator 57 resumes its modified-periodic operation in response to the pulses of curve E after reset, and when pulse 90 of curve V is applied over conductor 77 to devices 105 and 110, device 105 being in its conductive condition is rendered non-conductive while device 110 is rendered conductive. Of course, pulses appearing on conductor 77 always trigger multivibrator 57 from one condition to the next inasmuch as such pulses are applied to the control electrodes of both tubes 105 and 110. When reset or reference pulse 92 of curve U occurs, it is applied to control electrode 104 of tube 105, but since that tube is already in its reference operating condition, the pulse has no effect. Similarly, pulse 93 of curve P is also ineffective since it finds device 105 already in its non-conductive condition.

The signal developed at anode 106, namely that of curve Q, is applied to the differentiating circuit 113, 114 to produce the signal of curve R. This latter signal is impressed on control electrode 112 of buffer amplifier device 116 which is normally biased beyond cut-off by means of the negative potential impressed on control electrode 112 from source 115; thus only the positive-polarity differentiated pulses of curve R are translated through the buffer stage and appear across resistor 126 with a normal 180° phase inversion. The signal of curve S therefore appears at anode 117 of device 116 and is impressed on control electrodes 122 and 123 of the second multivibrator 58 of control mechanism 56 via condensers 118 and 119 to trigger multivibrator 58 between its two operating conditions to produce the output signal of curve T in the same manner as explained with respect to multivibrator 57.

As in the case of multivibrator 57, multivibrator 58 also operates not only from the pulses of curve S but also from the pulses translated thereto from transposition mechanism 40. In response to pulse 86 of curve N which is applied to control electrode 122 of device 120 over resistor 74 and the cross-coupling circuit from anode 125, device 120 is actuated from its conductive to its non-conductive condition and device 124 from its non-conductive to its conductive condition, as illustrated by the waveform of curve T. It will be noted that curve T depicts the waveform at the anode 125 of tube 124 whereas curve Q illustrates the waveform at the anode 106 of tube 105. The pulse 88 of curve W is applied to both tubes 120 and 124 and thus is effective to trigger multivibrator 58 no matter what condition it is in. In response to the reset or reference pulse 89 of curve U, which is applied to control electrode 122 of device 120 via resistor 73, multivibrator 58 assumes its reference operating condition wherein device 124 is conductive and device 120 is non-conductive. Pulse 91 of curve W triggers multivibrator 58 from one condition to the next inasmuch as it is applied to both control electrode 122 and control electrode 123. Finally, in response to the reset pulse 92 of curve U, multivibrator 58 is triggered to its reference operating condition.

The output signal from multivibrator 58 having the very irregular wave form as shown in curve T is applied to the beam-deflection electrodes of coder 12 to switch the beam from one anode to the next in response to each amplitude variation and thus to phase invert the audio intelligence at such times. It should be apparent that because of the action of the signal bursts of various frequencies, the coding schedule is very complex in nature and thus exceedingly difficult to appropriate in the absence of any advance information as to the particular setting of the transposition mechanism.

In order that authorized receivers may utilize the coded transmission, it is necessary that the encoding components of curve G as well as the sinusoidal signals developed in oscillator 14, divider 16 and divider 19 be made known to such authorized receivers. To that end, the bursts of various frequencies as illustrated in curve G, the 1.6-kilocycle sine wave signal from divider 16, and the 200-cycle sine wave signal from divider 19 are modulated in auxiliary modulator 20 on a 58-kilocycle sub-carrier wave supplied to modulator 20 from generator 17. The modulated sub-carrier wave is then modulated, in turn, on the radio-frequency FM carrier in unit 13. Meanwhile, the 16-kilocycle sinusoidal signal from reference oscillator 14 is directly modulated on the FM carrier in modulator 13. With such an arrangement, the conventional FM channel having a bandwidth of ±75 kilocycles may be separated into two portions, the first of which includes the audio information plus the 16-kilocycle reference signal and is confined from zero to ±40 kilocycles whereas the second portion which includes the coding components, the 1.6-kilocycle sine wave signal and the 200-cycle sine wave signal may be confined from ±40 to ±75 kilocycles. Of course, the reference sinusoidal signal developed in oscillator 14 may exhibit any suitable frequency that permits convenient transmission over a relatively narrow bandwidth. For example, in the illustrated case the reference signal may have any suitable frequency that may be transmitted over the conventional FM channel band-width of ±75 kilocycles.

Figure 5:
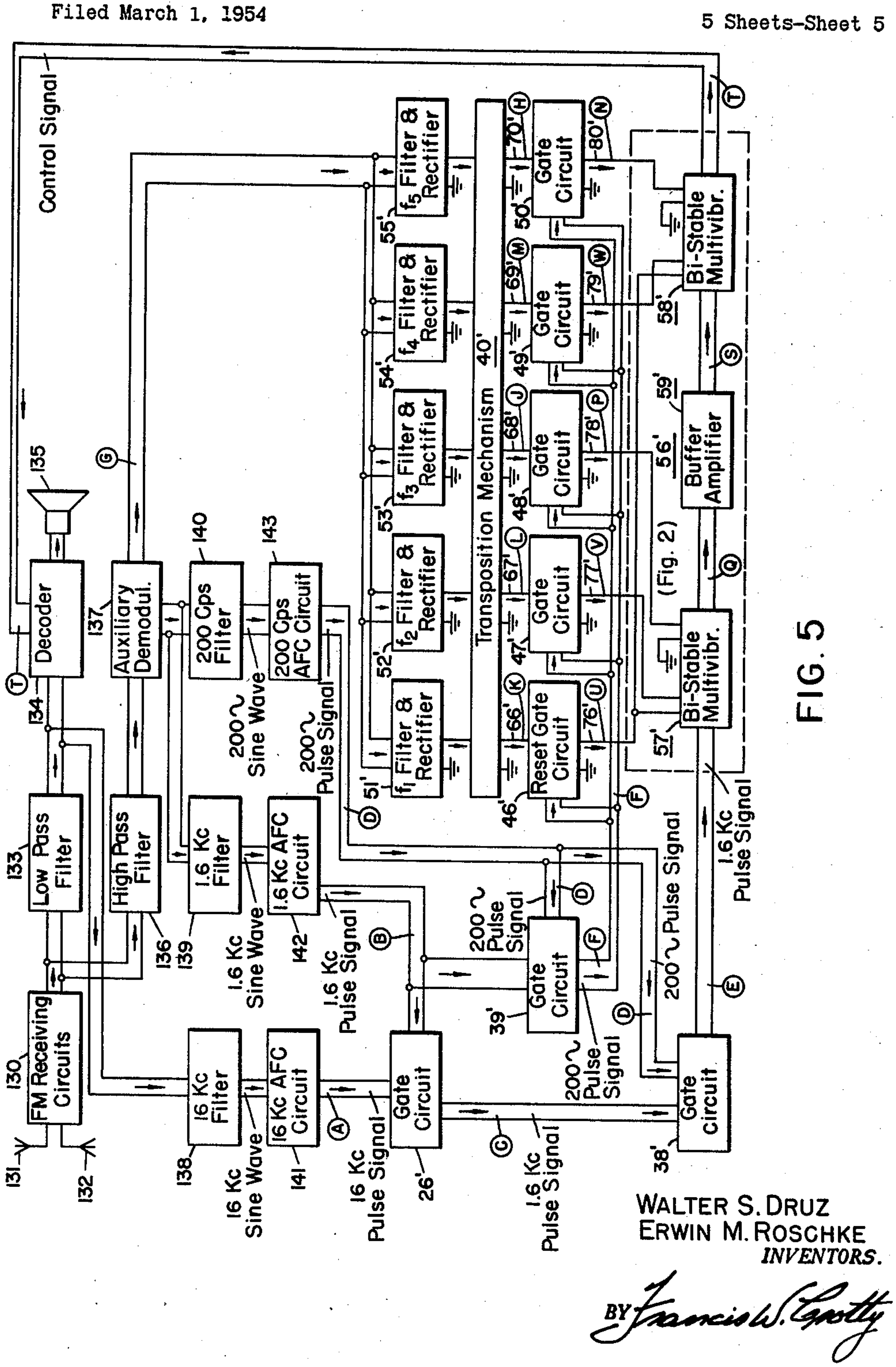
Figure 5 is a schematic representation of an FM receiver constructed in accordance with the invention for operation in conjunction with the transmitter of Figure 1.

A receiver which may utilize the coded intelligence signal from the transmitter of Figure 1 is shown in Figure 5 and includes an antenna 131, 132 which is connected to the input terminals of conventional FM receiving circuit 130 which may include suitable radio-frequency amplifier, oscillator-converter, intermediate-frequency amplifier, limiter, discriminator, and audio amplifier stages and which supply coded audio-frequency signals to a low-pass filter 133. This filter is, in turn, connected to one pair of input terminals of a decoder 134 which may be constructed in exactly the same manner as coder 12 at the transmitter. The output circuit of decoder 134 is coupled to a loud speaker 135. A 16-kilocycle tuned filter 138 is also coupled to the output terminals of low-pass filter 133 and is, in turn, connected to a 16-kilocycle AFC circuit 141. The output terminals of the AFC circuit are connected to one pair of input terminals of a gate circuit 26′. FM receiving circuits 130 are also connected to the input terminals of a high-pass filter 136 which is coupled to an auxiliary demodulator 137. This demodulator is, in turn, coupled to a 1.6-kilocycle tuned filter 139, a 200-cycle tuned filter 140, and a series of filter and rectifier units 51′–55′. Filter 139 is connected to a 1.6-kilocycle AFC circuit 142 having output terminals connected to another input circuit of gate 26′. Filter 140 has its output terminals connected to a 200-cycle AFC circuit 143 which, in turn, is connected to one pair of input terminals of a gate circuit 39′, this gate also having another pair of input terminals connected to AFC circuit 142. The remaining components of the receiver of Figure 5 including gate circuits 26′ and 39′ are identical to corresponding components at the transmitter, as indicated by the use of corresponding primed reference numerals.

Automatic frequency control circuits 141, 142 and 143 may be of the conventional type wherein a received pulse signal, such as a horizontal synchronizing signal in a television system, is compared with a locally generated sine wave to produce an output signal synchronized with the received pulses. In the present system, however, instead of producing a sinusoidal signal and comparing it with a received pulse signal, a pulse oscillator is employed to produce locally pulses that are compared with a received sinusoidal signal to develop output pulses synchronized with the sine wave.

In operation, the coded intelligence signal is received on antenna 131, 132, and is amplified and demodulated in conventional manner in FM receiver 130. The demodulated sound is supplied through low-pass filter 133 to decoder 134 and subsequently to speaker 135. The 58-kilocycle sub-carrier and associated sidebands are filtered out from the demodulated sound by high-pass filter 136 and applied to auxiliary demodulator 137. The 16-kilocycle sinusoidal reference signal is filtered out from the demodulated audio by means of filter 138 and is converted to a pulse signal corresponding to that shown in curve A in AFC circuit 141. Meanwhile, filter 139 derives the 1.6-kilocycle signal from the subcarrier in demodulator 137 and supplies that signal to AFC circuit 142 in order to produce a 1.6-kilocycle pulse signal similar to that shown in curve B. Similarly, filter 140 derives the 200-cycle sine wave signal from the subcarrier in demodulator 137 and applies that signal to AFC circuit 143 to develop a 200-cycle pulse signal similar to that shown in curve D.

The decoding operation which takes place at the receiver of Figure 5 is identical to the coding operation occurring at the transmitter. The three necessary pulse signals, namely, 16 kilocycles, 1.6 kilocycles and 200 cycles, plus the code signal bursts are applied to the decoding equipment in exactly the same manner as at the transmitter. Control mechanism 56′ develops a control signal identical to that developed at the transmitter and is applied to decoder 134 to effect phase inversions in exact time coincidence with correspondnig phase inversions at the transmitter. To provide accurate decoding, the transposition mechanism 40′ must, of course, be adjusted to correspond to the setting employed at the transmitter to establish the code schedule; by controlling the distribution of the transposition mechanism setting information, the objectives of secrecy communication may be fully realized.

The invention, therefore, provides a narrow-band secrecy communication system wherein mode changes may be effected at the transmitter and various authorized receivers in exact time coincidence and in accordance with a very complex coding schedule.

While particular embodiments of the invention have been shown and described, modifications may be made, and it is intended in the appended claims to cover all such modifications as fall within the true spirit and scope of the invention.

We claim:

1. A secrecy communication system comprising: means for developing an intelligence signal consisting of frequency components falling within a relatively narrow frequency band; an encoding device coupled to said intelligence signal developing means and responsive to an applied control signal for varying the operating mode of said system; a signal source for developing a signal having a sinusoidal wave shape and having a predetermined frequency also falling within said narrow frequency band; a pulse forming circuit coupled to said signal source for developing a series of signal pulses periodically recurring at a frequency related to said predetermined frequency and individually exhibiting a relatively high order of precision timing; a gate circuit coupled to said pulse forming circuit; means including another pulse forming circuit coupled to said gate circuit for effecting actuation thereof to select only certain ones of said signal pulses; a control mechanism coupled to said gate circuit for developing a control signal having characteristic variations occurring in time coincidence with at least some of the pulses selected by said gate circuit; and means coupling said control mechanism to said encoding device to effect actuation of said device for varying the operating mode of said system in response to, and in time coincidence with, each such characteristic variation effectively to encode said intelligence signal.

2. A secrecy communication system comprising: means for developing an intelligence signal consisting of frequency components falling within a relatively narrow frequency band; an encoding device coupled to said intelligence signal developing means and having at least two operating conditions each of which establishes a different operating mode in said system; a signal source for developing a signal having a sinusoidal wave shape and having a predetermined frequency also falling within said narrow frequency band; pulse forming means coupled to said signal source for developing a series of signal pulses periodically recurring at a frequency related to said predetermined frequency and individually exhibiting a relatively high order of precision timing; gating means coupled to said pulse forming means for developing a series of signal pulses periodically recurring at a frequency which is sub-harmonically related to the frequency of the pulses developd by said pulse forming means; a cyclic pulse counting mechanism coupled to said gating means and having a plurality of operating steps for developing a control signal having an amplitude which varies periodically between at least two levels upon the completion of each operating cycle, said counting mechanism advancing from one step to the next in response to each pulse developed by said gating means; means coupled to said pulse counting mechanism for interrupting the cyclic operation of said mechanism in accordance with a predetermined code schedule; and means coupling said pulse counting mechanism to said encoding device to effect actuation of said device from one to another of its aforesaid operating conditions for varying the operating mode of said system in response to, and in time coincidence with, each such amplitude variation.

3. A secrecy communication system comprising: means for developing an intelligence signal consisting of frequency components falling within a relatively narrow frequency band; an encoding device coupled to said intelligence signal developing means and responsive to an applied control signal for varying the operating mode of said system; a first signal source for developing a signal having a sinusoidal wave shape and having a predetermined frequency also falling within said narrow frequency band; pulse forming means coupled to said first signal source for developing a series of signal pulses periodically recurring at a relatively high rate and individually exhibiting a relatively high order of precision timing; a second signal source for developing a series of signal pulses periodically recurring at a relatively low rate and individually exhibiting a relatively low order of precision timing; gating means coupled to said pulse forming means and to said second signal source for developing a series of pulses recurring at said relatively low rate but individually having said relatively high order of precision timing; a control mechanism coupled to said gating means for developing a control signal having characteristic variations occurring in time coincidence with at least some of the pulses developed by said gating means; and means coupling said control mechanism to said encoding device to effect actuation of said device for varying the operating mode of said system in response to, and in time coincidence with, each such characteristic variation effectively to encode said intelligence signal.

4. A secrecy communication system comprising: means for developing an intelligence signal consisting of frequency components falling within a relatively narrow frequency band; an encoding device coupled to said intelligence signal developing means and responsive to an applied control signal for varying the operating mode of said system; a first signal source for developing a signal having a sinusoidal wave shape and having a predetermined frequency also falling within said narrow frequency band; a first pulse forming circuit coupled to said first signal source for developing a series of signal pulses periodically recurring at a relatively high rate and individually exhibiting a relatively low order of precision timing; a second signal source for developing a signal having a sinusoidal wave shape and having a predetermined frequency which is sub-harmonically related to the frequency of the signal developed by said first signal source; a second pulse forming circuit coupled to said second signal source for developing a series of signal pulses periodically recurring at a relatively low rate and individually exhibiting a relatively low order of precision timing; gating means coupled to said first and second pulse forming circuits for developing a series of pulses recurring at said relatively low rate but individually having said relatively high order of precision timing; a control mechanism coupled to said gating means for developing a control signal having characteristic variations occurring in time coincidence with at least some of the pulses developed by said gating means; and means coupling said control mechanism to said encoding device to effect actuation of said device for varying the operating mode of said system in response to, and in time coincidence with, each such characteristic variation effectively to encode said intelligence signal.

5. A secrecy communication system comprising: means for developing an intelligence signal consisting of frequency components falling within a relatively narrow frequency band; an encoding device coupled to said intelligence signal developing means and responsive to an applied control signal for varying the operating mode of said system; a first signal source for developing a signal having a sinusoidal wave shape and having a predetermined frequency also falling within said narrow frequency band; pulse forming means coupled to said first signal source for developing a series of signal pulses periodically recurring at a relatively high rate and individually exhibiting a relatively narrow pulse width and a relatively high order of precision timing; a second signal source for developing a series of signal pulses periodically recurring at a relatively low rate and individually exhibiting a relatively wide pulse width and a relatively low order of precision timing; gating means coupled to said pulse forming means and to said second signal source for developing a series of pulses recurring at said relatively low rate but individually having said relatively narrow pulse width and said relatively high order of precision timing; a control mechanism coupled to said gating means for developing a control signal having characteristic variations occurring in time coincidence with at least some of the pulses developed by said gating means; and means coupling said control mechanism to said encoding device to effect actuation of said device for varying the operating mode of said system in response to, and in time coincidence with, each such characteristic variation effectively to encode said intelligence signal.

6. A secrecy radio communication system comprising: means for developing an audio signal consisting of frequency components falling within a relatively narrow frequency band; a phase-inverting encoding device coupled to said audio signal developing means and responsive to an applied control signal for inverting the phase of said audio signal; a first signal source for developing a signal having a sinusoidal wave shape and having a relatively high frequency also falling within said narrow frequency band; pulse forming means coupled to said first signal source for developing a series of signal pulses periodically recurring at said relatively high frequency and individually exhibiting a relatively narrow pulse width and a relatively high order of precision timing; a second signal source for developing a series of signal pulses periodically recurring at a relatively low frequency and individually exhibiting a wide pulse width and a relatively low order of precision timing; gating means coupled to said pulse forming means and to said second signal source for developing a series of pulses recurring at said relatively low frequency but individually having said relatively narrow pulse width and said relatively high order of precision timing; a control mechanism coupled to said gating means for developing a control signal having characteristic variations occurring in time coincidence with at least some of the pulses developed by said gating means; and means coupling said control mechanism to said encoding device to effect actuation of said device for inverting the phase of said audio signal in response to, and in time coincidence with, each such characteristic variation effectively to encode said audio signal.

7. A secrecy communication transmitter comprising: means for developing an audio signal consisting of frequency components falling within a relatively narrow frequency band; a coding device coupled to said audio signal developing means and responsive to an applied control signal for varying the operating mode of said transmitter; a first signal source for developing a signal having a sinusoidal wave shape and having a relatively high frequency also falling within said narrow frequency band; pulse forming means coupled to said first signal source for developing a series of signal pulses periodically recurring at said relatively high frequency and individually exhibiting a relatively high order of precision timing; a second signal source coupled to said first signal source for developing a series of signal pulses periodically recurring at a relatively low frequency and individually exhibiting a relatively low order of precision timing; gating means coupled to said pulse forming means and said second signal source for developing a series of pulses recurring at said relatively low frequency but individually having said relatively high order of precision timing; a control mechanism coupled to said gating means for developing a control signal having characteristic variations occurring in time coincidence with at least some of the pulses developed by said gating means; means coupling said control mechanism to said coding device to effect actuation of said device for varying the operating mode of said transmitter in response to, and in time coincidence with, each such characteristic variation effectively to code said audio signal; and means coupled to said first signal source and to said coding device for concurrently radiating the sinusoidal signal from said source and the coded audio signal from said coding device to an authorized receiver.

8. A secrecy communication transmitter comprising: means for developing an audio signal consisting of frequency components falling within a relatively narrow frequency band; a phase-inverting decoding device coupled to said audio signal developing means and responsive to an applied control signal for inverting the phase of said audio signal; a first signal source for developing a signal having a sinusoidal wave shape and having a relatively high frequency also falling within said narrow frequency band; a first pulse forming circuit coupled to said first signal source for developing a series of signal pulses periodically recurring at said relatively high frequency and individually exhibiting a relatively narrow pulse width and a relatively high order of precision timing; a second signal source coupled to said first signal source for developing a signal having a sinusoidal wave shape and having a relatively low frequency which is sub-harmonically related to said relatively high frequency and also falling within said narrow frequency band; a second pulse forming circuit coupled to said second signal source for developing a series of signal pulses periodically recurring at said relatively low frequency and individually exhibiting a relatively wide pulse width and a relatively low order of precision timing; gating means coupled to said first and second pulse forming circuits for developing a series of pulses recurring at said relatively low frequency but individually having said relatively narrow pulse width and said relatively high order of precision timing; a control mechanism coupled to said gating means for developing a control signal having characteristic variations occurring in time coincidence with at least some of the pulses developed by said gating means; means coupling said control mechanism to said coding device to effect actuation of said device for inverting the phase of said audio signal in response to, and in time coincidence with, each such characteristic variation effectively to code said audio signal; and means coupled to said first signal source, second signal source and coding device for concurrently radiating the sinusoidal signals from said sources and the coded audio signal from said coding device to an authorized receiver.

9. A secrecy radio receiver for utilizing an audio signal having a series of phase inversions in accordance with a predetermined code schedule and consisting of frequency components falling within a relatively narrow frequency band, and for utilizing a first sinusoidal signal related to said code schedule and having a relatively high frequency also falling within said narrow frequency band, and for also utilizing a second sinusoidal signal also related to said code schedule and having a relatively low frequency sub-harmonically related to said relatively high frequency and also falling within said narrow frequency band, said sinusoidal signals constituting modulation components of said audio signal, said receiver comprising: a phase-inverting decoding device responsive to an applied control signal for varying the operating mode of said receiver; means for deriving said first sinusoidal signal from said audio signal; a first pulse forming circuit coupled to said first sinusoidal signal deriving means for developing a series of signal pulses periodically recurring at said relatively high frequency and individually exhibiting a relatively narrow pulse width and a relatively high order of precision timing; means for deriving said second sinusoidal signal from said audio signal; a second pulse forming circuit coupled to said second sinusoidal signal deriving means for developing a series of pulses periodically recurring at said relatively low frequency and individually exhibiting a relatively wide pulse width and a relatively low order of precision timing; gating means coupled to said first and second pulse forming circuits for developing a series of pulses recurring at said relatively low frequency but individually having said relatively narrow pulse width and said relatively high order of precision timing; a control mechanism coupled to said gating means for developing a control signal having characteristic variations occurring in time coincidence with at least some of the pulses developed by said gating means; and means coupling said control mechanism to said decoding device to effect actuation of said device for varying the operating mode of said receiver in response to, and in time coincidence with, each such characteristic variation to reinvert the phase of said audio signal effectively to decode said audio signal.

References Cited in the file of this patent

UNITED STATES PATENTS 2,272,999 Curtis ---------------- Feb. 10, 1942
2,402,058 Loughren ------------- June 11, 1946
2,479,338 Gabrilovitch ----------- Aug. 16, 1949
2,510,054 Alexander et al. --------- June 6, 1950
2,582,968 Deloraine et al. --------- Jan. 22, 1952
2,694,104 Druz ------------------ Nov. 9, 1954
2,697,741 Roschke --------------- Dec. 21, 1954
2,778,009 Bridges --------------- Jan. 15, 1957